United States Patent
Dirstine et al.

(10) Patent No.: US 6,976,100 B2
(45) Date of Patent: Dec. 13, 2005

(54) AUTONOMIC I/O ADAPTER RESPONSE PERFORMANCE OPTIMIZATION USING POLLING

(75) Inventors: Shelly Marie Dirstine, Rochester, MN (US); Naresh Nayar, Rochester, MN (US); Gregory Michael Nordstrom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/424,198

(22) Filed: Apr. 25, 2003

(65) Prior Publication Data

US 2004/0215847 A1 Oct. 28, 2004

(51) Int. Cl.[7] .................................................. G06F 3/00

(52) U.S. Cl. ............................ 710/54; 710/19; 710/39; 710/46; 710/52; 711/1; 711/100

(58) Field of Search ............................. 710/15–19, 39, 710/46, 52–54; 711/1, 100

(56) References Cited

U.S. PATENT DOCUMENTS

| | | | |
|---|---|---|---|
| 5,983,292 A | 11/1999 | Nordstrom et al. | |
| 6,085,277 A | 7/2000 | Nordstrom et al. | |
| 6,810,440 B2 * | 10/2004 | Micalizzi et al. | 710/19 |
| 6,813,658 B2 * | 11/2004 | Lam et al. | 710/54 |

* cited by examiner

Primary Examiner—Kim Huynh
(74) Attorney, Agent, or Firm—Moser, Patterson & Sheridan, LLP

(57) ABSTRACT

Methods, systems, and articles of manufacture for communicating with an I/O processor (IOP) are provided. Polling of message queue pointers is utilized to detect the occurrence of certain message queue related events, rather than rely on interrupts generated by the IOP. The polling may decrease the disruptive effects of IOP generated interrupts. In an effort to minimize the latency associated with detecting IOP related events, the polling may be initiated frequently by an operating system task dispatcher. In an effort to minimize context switches, the task dispatcher may schedule the processing of upstream messages detected while polling to coincide with naturally occurring task swaps.

14 Claims, 9 Drawing Sheets

AUTONOMIC I/O ADAPTER RESPONSE PERFORMANCE OPTIMIZATION USING POLLING

CROSS-REFERENCE TO RELATED APPLICATIONS

The present application is related to U.S. Pat. No. 5,983,292, entitled "Message Transport Mechanisms and Methods" and in commonly owned U.S. Pat. No. 6,085,277, entitled "Interrupt and Message Batching Apparatus and Method", which are herein incorporated by reference.

BACKGROUND OF THE INVENTION

1. Field of the Invention

The present invention generally relates to computer systems and more particularly to input/output (I/O) processing within computer systems.

2. Description of the Related Art

Computer systems typically include one or more central processing units (CPUs) and memory, collectively referred to as a processing complex, and an I/O interface to allow the processing complex to communicate with peripheral or external I/O devices. The I/O interface is generally designed to facilitate communication between the processing complex and a wide variety of I/O devices, such as hard disks, network adapters, and the like.

One type of I/O interface utilized by some computer systems is a hierarchical input/output (I/O) interface, in which a variety of I/O devices are interfaced with the processing complex through a hierarchical arrangement of I/O adapters (IOAs) and input/output processors (IOPs). An IOA generally refers to interface control logic for a peripheral component that implements a particular type of connection (e.g., Ethernet, SCSI, and the like). As such, IOAs are typically fairly simple, and often lack powerful processors and large arrays of memory. An IOP, on the other hand, generally refers to interface control logic that typically includes a relatively complex processor and an appreciable amount of memory, and is often used as an interface between the processor complex and several other IOAs. An IOP may be considered a specific, powerful example of an IOA.

A single IOP may handle much of the I/O processing for several IOAs that might otherwise be handled by the processor complex. By allocating I/O processing to an IOP, significant performance gains are often realized, since the processing complex can be freed from having to directly handle many of the (often time-consuming) operations associated with I/O data transfers and interrupt handling associated with the IOAs. Moreover, IOPs typically provide a highly configurable and flexible interface for peripheral components, since much of the interface logic can be implemented in software that is executed by the IOPs. As a result, IOPs may hide many of the details specific to the underlying hardware of the peripheral components from the processor complex.

In conventional I/O protocols, operating system device driver programs create command messages that are transmitted across an I/O bus to a targeted IOP. The IOP interprets the command and performs the requested operation, usually transferring data between an I/O device connected to the IOP and main memory across the I/O bus. Data is typically transferred by using known direct memory access (DMA) mechanisms that are part of the I/O bus functions. In some implementations, when the IOP completes the requested operation, it creates a response message that is also DMA'd to main memory. The response message may then be retrieved from response queue by a CPU for interpretation by a device driver or application program running on the operating system.

One particular I/O bus implementation uses a pair of message queues to communicate with IOPs. The pair of message queues consists of a "downstream" message queue for sending (command) messages to the IOP, and an "upstream" queue for receiving (response) messages from the IOP. Both are circular queues that may reside in main memory. IOP hardware typically uses DMA to access the downstream queue to retrieve downstream messages and to access the upstream queue to enqueue (place in the upstream queue) upstream messages.

Typically, the IOP hardware that supports the queueing includes an interrupt mechanism that also allows for the creation of interrupts to signal the operating system upon the occurrence of various events relating to the message queues. For example, the IOP hardware may generate an interrupt when a particular downstream message has been retrieved, when the downstream queue is full (e.g., the operating system had enqueued messages in all available queue entry locations), and when a downstream queue full condition has been relieved (e.g., IOP has emptied a number of queue entry locations after the queue had become full). The IOP may also generate an interrupt when one or more upstream messages has been posted to the upstream queue.

In response to receiving one of these interrupts, a CPU of the processor complex may switch processor execution from its current program to an operating system or device driver program designed to interpret and process (handle) the interrupt event. While this interrupt mechanism can minimize the latency associated with the completion of an I/O command and interpretation of a response message, switching the processor execution from its current program to an interrupt program requires a processor context switch that may require many instruction cycles. For example, a context switch may involve saving a currently executing task's critical information (such as selected processor registers and state information) and loading an interrupt handler's critical information. Further, when the interrupt handler completes its processing, there is another context switch to restore the critical information of the interrupted task to resume its execution.

Thus, IOP interrupts can be disruptive to the system and may decrease performance. Accordingly, there is a need for an improved method and system for communicating between a processor complex and an IOP, preferably that decrease the disruptive effects of IOP interrupts.

SUMMARY OF THE INVENTION

The present invention generally is directed to methods, articles of manufacture, and systems for communication between one or more I/O processors (IOPs) and a processor complex having one or more processors.

One embodiment provides a method for detecting one or more events occurring in an input/output (I/O) processing system utilizing at least one message queue. The method generally includes examining the value of one or more pointers to locations within the at least one message queue and determining whether an event has occurred based on the value of the examined one or more pointers.

Another embodiment provides a method for communicating between a processor complex having one or more processors and a plurality of input/output (I/O) processors using at least one message queue associated with each I/O processor. The method generally includes for each I/O processor, polling a set of pointers to the associated at least one message queue, wherein each set of pointers comprises a first pointer indicating a location of a message posted to the at least one message queue by the I/O processor and a second pointer indicating a location of a most recent message processed by the processor complex and determining the I/O processor has posted at least one message to the at least one message queue since the most recent message was processed by the processor complex, if values of the first and second pointers are not equal.

Another embodiment provides a computer-readable medium containing a program for detecting messages posted by one or more I/O processors to associated upstream message queues. When executed by a processor, the program performs operations generally including polling a set of pointers to the associated upstream message queue, wherein each set of pointers comprises a first pointer indicating a location of a message posted to the associated upstream message queue by the I/O processor and a second pointer indicating a location of a most recent message processed by a processor complex and determining the I/O processor has posted at least one message to the associated upstream message queue since the most recent message was processed by the processor complex, if values of the first and second pointers are not equal.

Another embodiment provides an I/O processing system generally including a processor complex having one or more processors, a plurality of I/O processors, each coupled with one or more I/O devices, at least one upstream queue corresponding to each I/O processor, a set of queue pointers, and an executable software component. The set of queue pointers includes, for each upstream queue, a first pointer indicative of a location of a most recent message posted to the upstream queue by a corresponding I/O processor and a second pointer indicative of a location of a most recent message processed by the processor complex. The executable software component is generally configured to poll the set of pointers to determine, for each upstream queue, the number of messages that have been posted to the upstream queue by the corresponding I/O processor since the most recent message was processed by the processor complex, based on relative values of the corresponding first and second pointers.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method, system, and article of manufacture for communicating with an I/O processor (IOP). Embodiments of the present invention utilize polling of message queue pointers to detect the occurrence of certain message queue related events, rather than rely on interrupts generated by the IOP. Thus, the polling may decrease the disruptive effects of IOP generated interrupts. To minimize the latency associated with detecting IOP related events, the polling may be initiated frequently by an operating system task dispatcher. For some embodiments, the task dispatcher may schedule the processing of upstream messages detected while polling to coincide with naturally occurring task swaps, thus minimizing the disruptive affects of polling.

One embodiment of the invention is implemented as a program product for use with a computer system such as, for example, the logically partitioned computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

Figure 1:
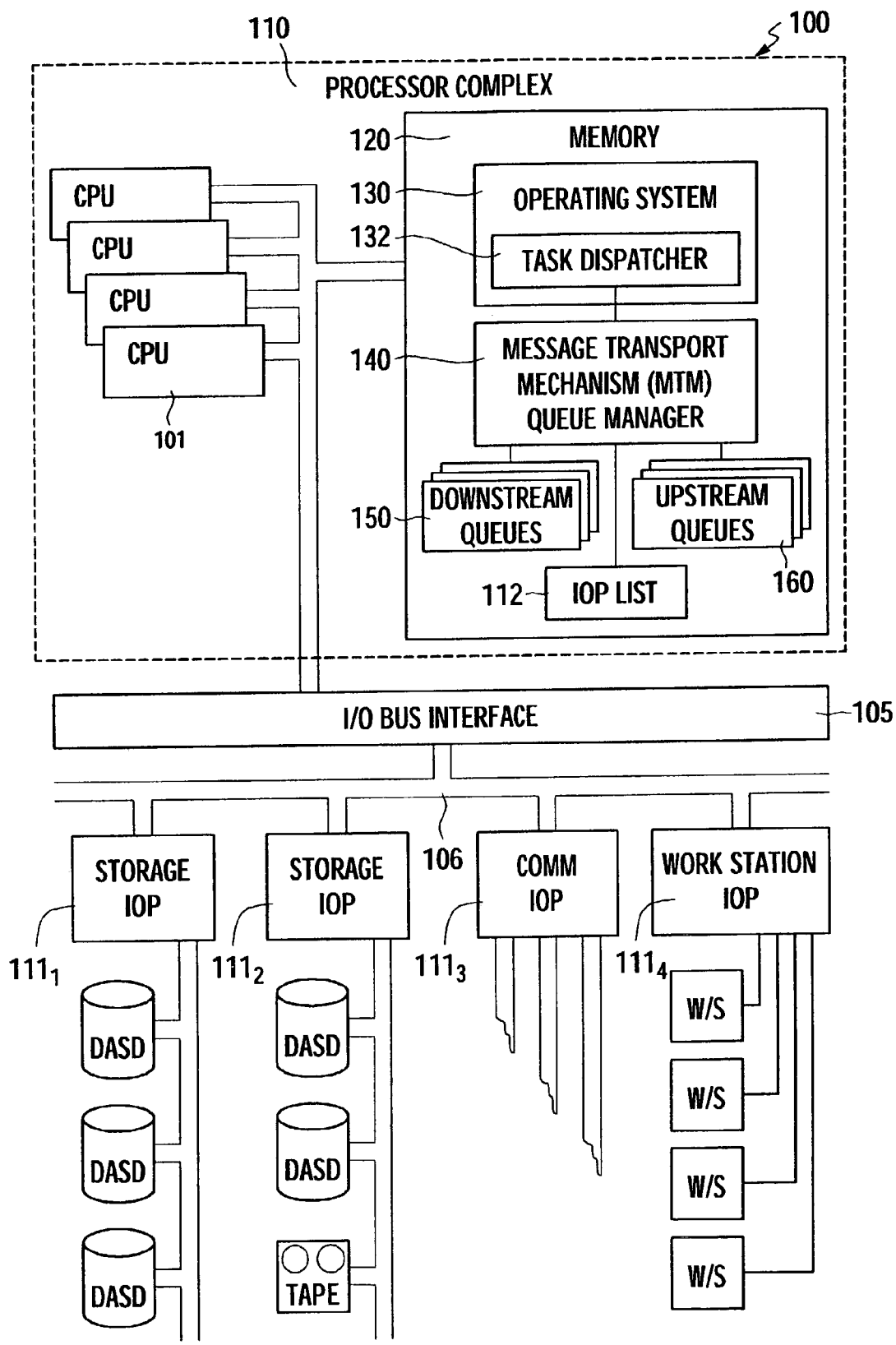
FIG. 1 is a computer system illustratively utilized in accordance with the invention.

In general, the routines executed to implement the embodiments of the invention, may be part of an operating system or a specific application, component, program, module, object, or sequence of instructions, embodied, for example, in an operating system task dispatcher 132 and a message transport mechanism (MTM) queue manager 140 shown in FIG. 1. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Computer System

FIG. 1 illustrates the major hardware and software components of a computer system 100 for utilizing message queue polling in accordance with embodiments of the present invention. The system 100 may be any suitable type of computer system capable of supporting the methods and operations described herein, such as a network server, mainframe computer, and the like. In one embodiment, the computer system 110 is an eServer iSeries computer system available from International Business Machines (IBM) of Armonk, N.Y.

As illustrated, the system 100 may include a processor complex 110 including multiple central processing units (CPUs) 101 concurrently perform basic machine processing function on instructions and data from memory 120. A memory bus 103 connects the various CPUs 101 and memory 120 to an I/O bus interface unit 105. The I/O bus interface unit 105 communicates with multiple I/O processing units (IOPs) $111_1$–$111_4$ (collectively IOPs 111) through an I/O bus 106, which may be any suitable bus, such as an industry standard PCI bus. As illustrated, the IOPs 111 may support communication with a variety of storage and I/O devices, such as direct access storage devices (DASD), tape drives, workstations, printers, remote communications lines for communication with remote devices or other computer systems, as well as other type I/O devices.

While a single memory bus 103, a single I/O bus 106, and four IOPs 111 (and various other devices) are shown in FIG. 1, it should be understood that FIG. 1 is intended only as an illustration of the possible types of devices that may be supported, and the actual number and configuration of CPUs 101, IOPs 111, memory buses 101, I/O buses 103, and various other system components may vary for different implementations. It should also be understood that the buses are illustrated in a simplified form as providing communications paths between various devices, and in fact the actual bus structure may be more complex, and contain additional hierarchies or components not shown. Further, while various other system components have been described and shown at a high level, it should be understood that a typical computer system contains many other components not shown, which are not essential to an understanding of the present invention.

As shown, the system 100 may include, within memory 120, an operating system 130 with a task dispatcher 132. The task dispatcher 132 is a software component that generally functions to schedule and dispatch various computing tasks among to be performed by the CPUs 101. As such, the task dispatcher 132 may be configured to perform the necessary processing to switch execution of a CPU 101 from a current task that has completed its operations to a new task (commonly referred to as a task swap).

As illustrated, the system 100 may also include a message transport mechanism (MTM) queue manager 140 generally configured to manage a set of message queue pairs used for communication between the processor complex 110 and the IOPs 111. In other words, there is typically one downstream message queue 150 and one upstream message queue 160 associated with each IOP 111. As will be described in greater detail, the task dispatcher 132 may initiate a poll for I/O related events via the MTM queue manager 140, causing the MTM queue manager 140 to examine the status of a set of MTM queue pointers associated with the message queue pairs of each IOP 111. The MTM queue manager 140 may maintain a list 112 of IOPs 111 that determines an order in which the MTM queue pointers are polled. For some embodiments, to optimize polling order, the list 112 may be dynamically reordered based on the number of upstream queue messages processed for each IOP 111. Of course, while shown as separate software components, for some embodiments, the task dispatcher 132 and MTM queue manager 140 may be one integrated software component.

Figure 2:
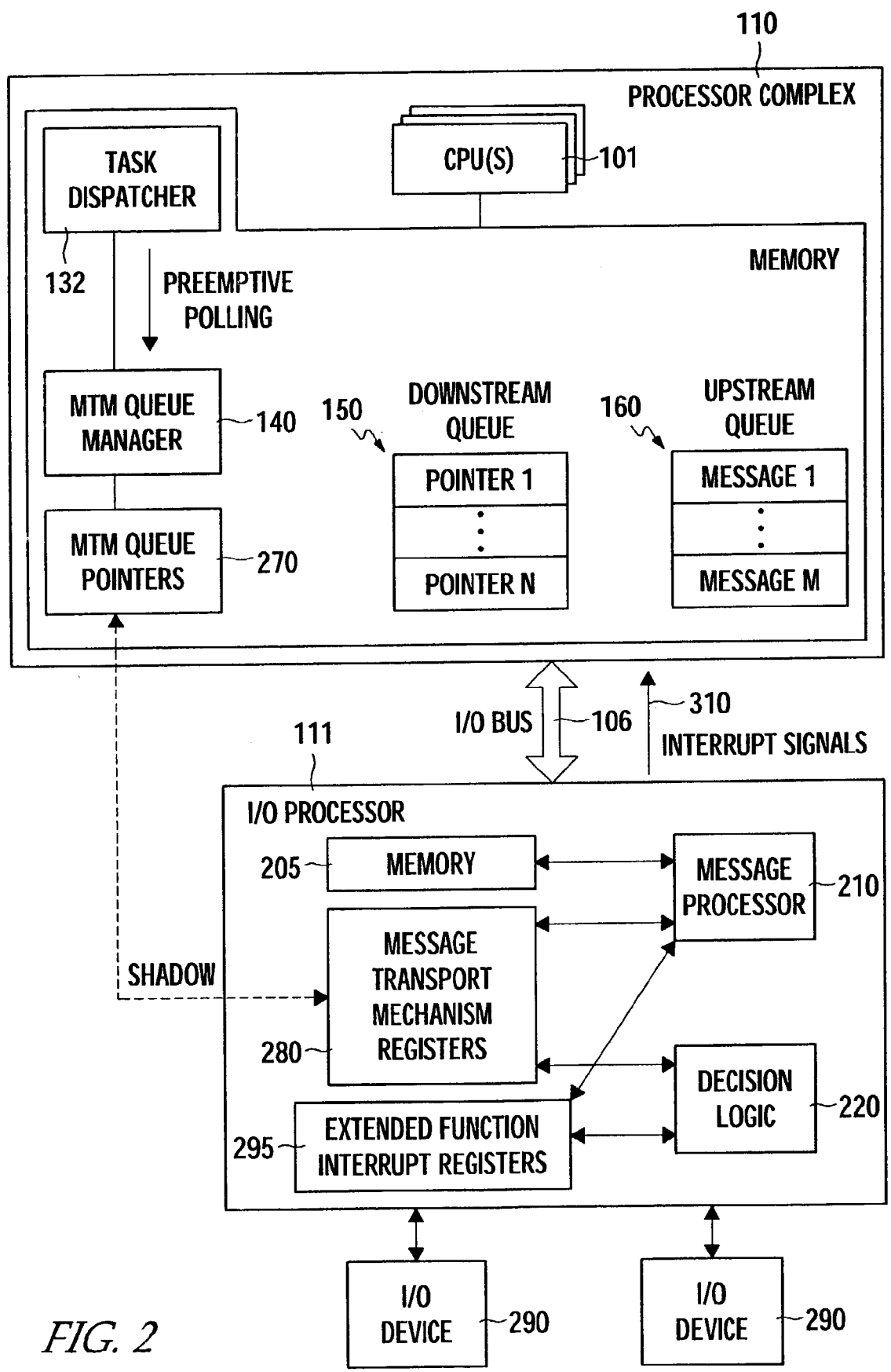
FIG. 2 is a relational view of components in accordance with embodiments of the present invention.

FIG. 2 is a relational view of the processor complex 110 and a single one of the IOPs 111 (coupled with I/O devices 290) that may be used to describe polling according to the present invention. To facilitate discussion, only one IOP 111 and a corresponding message queue pair (downstream message queue 150 and upstream message queue 160) is shown in memory 120. However, it should be understood that the memory 120 may include a plurality of message queue pairs for communicating with an associated plurality of IOPs 111. The implementation and use of message queue pairs as a message transport mechanism (MTM) is described in the commonly owned U.S. Pat. No. 5,983,292, entitled "Message Transport Mechanisms And Methods," herein incorporated by reference in its entirety, with relevant portions discussed below.

In addition to conventional I/O related control components, such as direct memory access components, the IOP 111 includes a message processor 210 in communication with decision logic 220. The IOP 111 also includes message transport mechanism (MTM) registers 280 and extended function interrupt registers 295 connected to the message processor 210 and decision logic 220, which may be used separately or in combination.

The MTM registers 280 include message queue pointers that point to current locations within the message queues for both the processor complex 110 (system queue pointers) and the IOP 111 (device queue pointers). As illustrated, the message queue pointers of the MTM registers 270 may be shadowed in a set of MTM queue pointer registers 270 maintained in the processor complex 110. The MTM registers 280 may include other registers, such as a response message pacing count register, a response message fast response time register, a response message slow response time register, a response timer, and a response message counter.

The MTM registers 280 may be accessed by decision logic 220 and message processor 210, directly or indirectly, to process messages received from the processor complex 110 (via the downstream queue 150), and generate one or more interrupt signals 310, in response thereto. For example, the IOP 111 may be configured (via the message processor 210 and decision logic 220) to generate an interrupt when the IOP 111 posts one or more new upstream messages or when the IOP has processed a number of downstream queue messages (thus relieving a downstream queue full condition). Further details of interrupt generation and MTM registers can be found in the previously referenced U.S. Pat. No. 5,983,292, and in the commonly owned U.S. Pat. No. 6,085,277, entitled "Interrupt And Message Batching Apparatus And Method," herein incorporated by reference in its entirety.

I/O Response Performance Optimization Using Polling

As previously described, however, interrupts generated by the IOP 111 may occur at inopportune times and processing the interrupts may be disruptive to current CPU execution. Therefore, the MTM queue manager 140 may poll the MTM queue pointers 270 to detect a number of MTM queue events, conventionally indicated by the interrupt signals 310, prior to the generation of interrupts by the IOP 111. In other words, using the polling to detect MTM queue events, the IOP 111 interrupts may be disabled (or an IOP 111 may be designed without an interrupt mechanism), thus avoiding potentially disruptive effects caused thereby.

Figure 3:
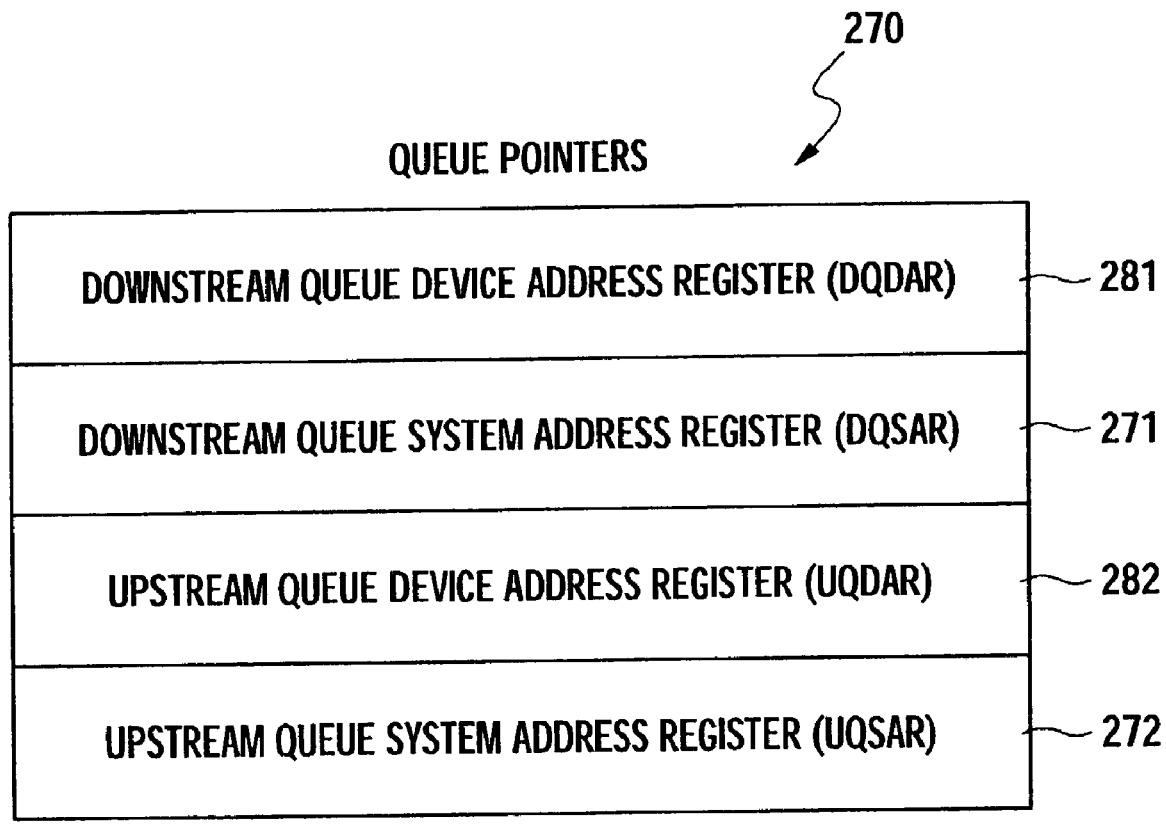
FIG. 3 is a list of exemplary queue pointer registers in accordance with an embodiment of the present invention.

As illustrated in FIG. 3, the MTM queue pointer registers 270 may include a Downstream Queue Device Address Register (DQDAR) 281, a Downstream Queue System Address Register (DQSAR) 271, an Upstream Queue Device Address Register (UQDAR) 282, and an Upstream Queue System Address Register (UQSAR) 272. Typically, the device queue pointer registers, DQDAR 281 and UQDAR 282 are updated (in the IOP MTM registers 280) by the IOP 111 (e.g., upon processing a downstream queue message and posting an upstream queue message, respectively) and subsequently transferred into (i.e., shadowed) the MTM queue pointer registers 270 in the processor complex 110. In a similar manner, the system queue pointer registers, DQSAR 271 and UQSAR 272 are updated by the processor complex 110 (e.g., upon posting a downstream message and processing an upstream message, respectively) and shadowed in the MTM registers 280 of the IOP 111.

The MTM queue pointer registers 270 illustrated in FIG. 3 may be examined and utilized to preemptively poll for events typically detected via IOP-generated interrupts. For example, FIGS. 4A and 4B, illustrate the detection of a downstream queue full status and posting of upstream messages, respectively.

Figure 4A:
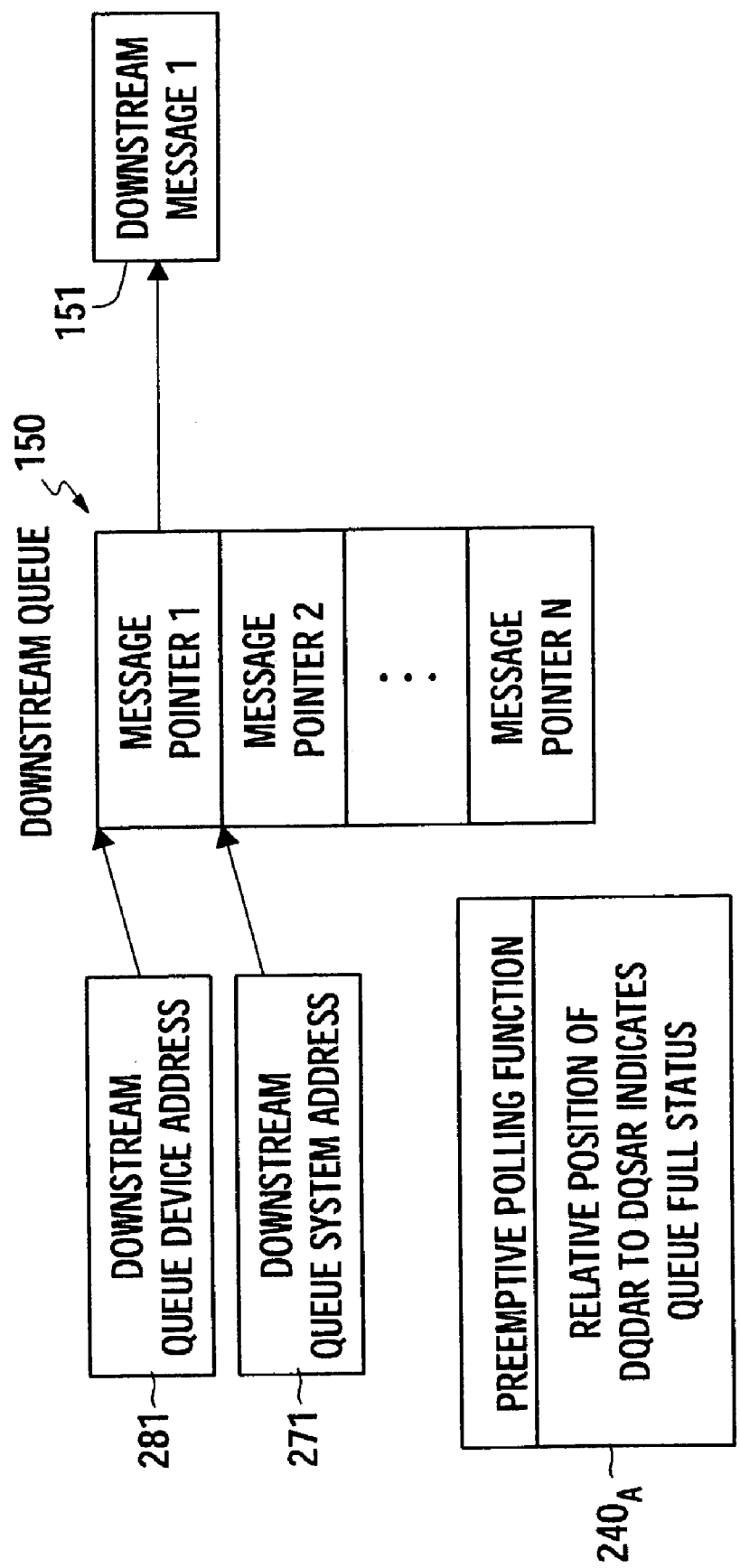
FIGS. 4A and 4B is a relational view of the exemplary queue pointer registers and a downstream queue and upstream queue, respectively, in accordance with an embodiment of the present invention.

As illustrated in FIG. 4A, the downstream queue 150 typically holds message pointers to downstream messages 151 posted by the processor complex 110, with the DQSAR 271 indicating a location within the downstream queue 150 of a pointer to the most recent message posted. DQDAR 281, on the other hand, indicates a location within the downstream queue 150 of a pointer to the last message processed by the IOP 111. Thus, as indicated by the preemptive polling function $240_A$, if a downstream queue full condition was previously detected, the relative position of the DQDAR 281 to the DQSAR 271 may indicate some of the downstream messages have been since processed, thus relieving the downstream queue full condition.

Figure 4B:
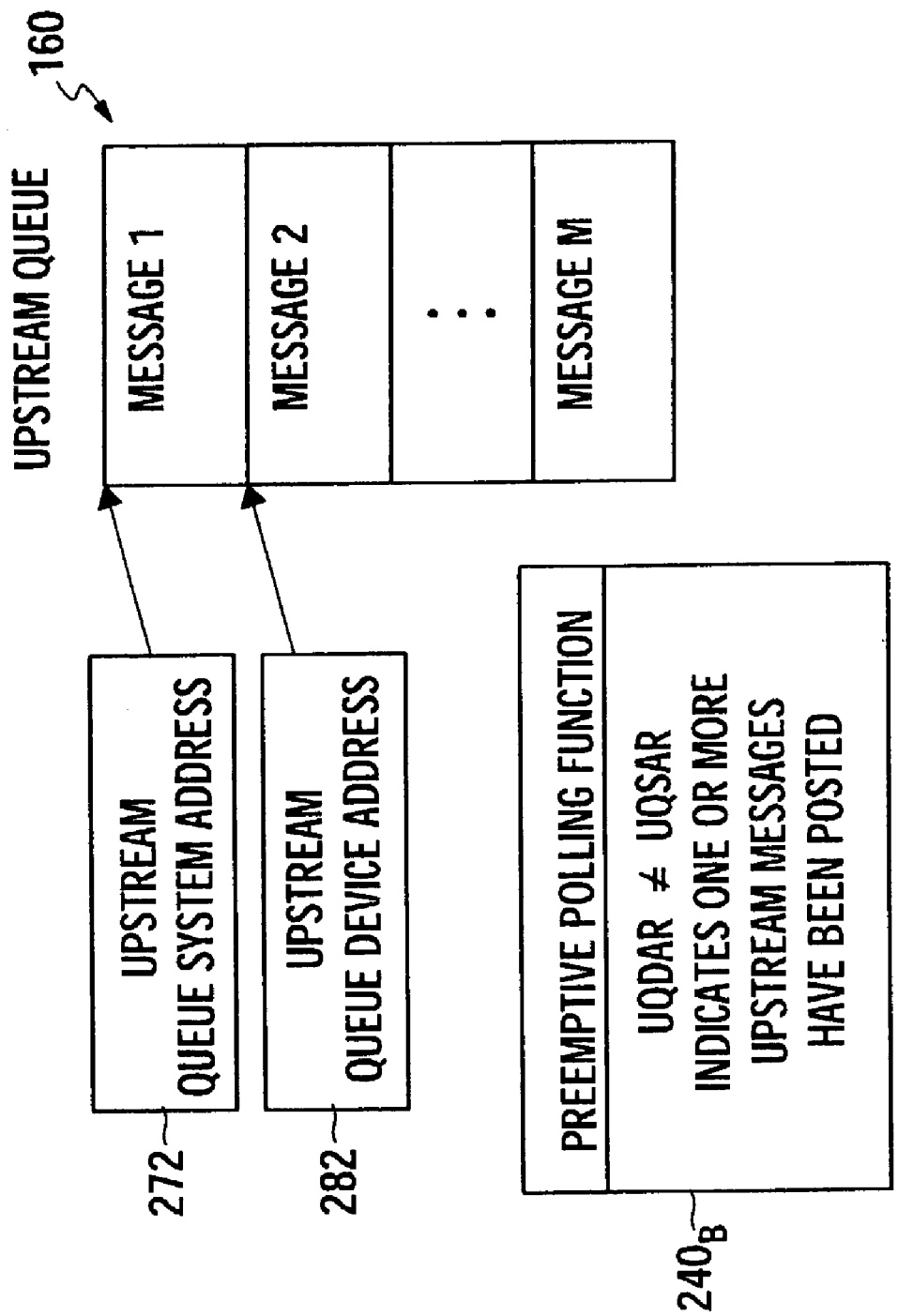

As illustrated in FIG. 4B, the upstream queue 160 typically holds upstream (e.g., response) messages posted by the IOP 111, with the UQDAR 282 indicating a location within the upstream queue 160 of a pointer to the last message posted. UQSAR 272, on the other hand, indicates a location within the upstream queue 160 of the last message processed by the processor complex. Therefore, as indicated by the preemptive polling function $240_B$, a difference between UQDAR 282 and UQSAR 272 may indicate the presence of one or more messages in the upstream queue 160 that have not been processed by the processor complex 110.

For some embodiments, this relationship between UQDAR 282 and UQSAR 272 may be utilized by the MTM queue manager 140 and task dispatcher 132 to poll for new upstream messages posted by one or more IOPs 111 (e.g., to detect the presence of such messages without receiving an interrupt). For example, the MTM queue manager 140 may be configured to poll the MTM queue pointers 270 associated with each of a plurality of IOPs 111 coupled with the processor complex 110 to check for newly posted upstream messages. For some embodiments, the MTM queue manager 140 may be configured to process newly detected upstream messages (and update UQSAR 272 to reflect such processing).

Figure 5:
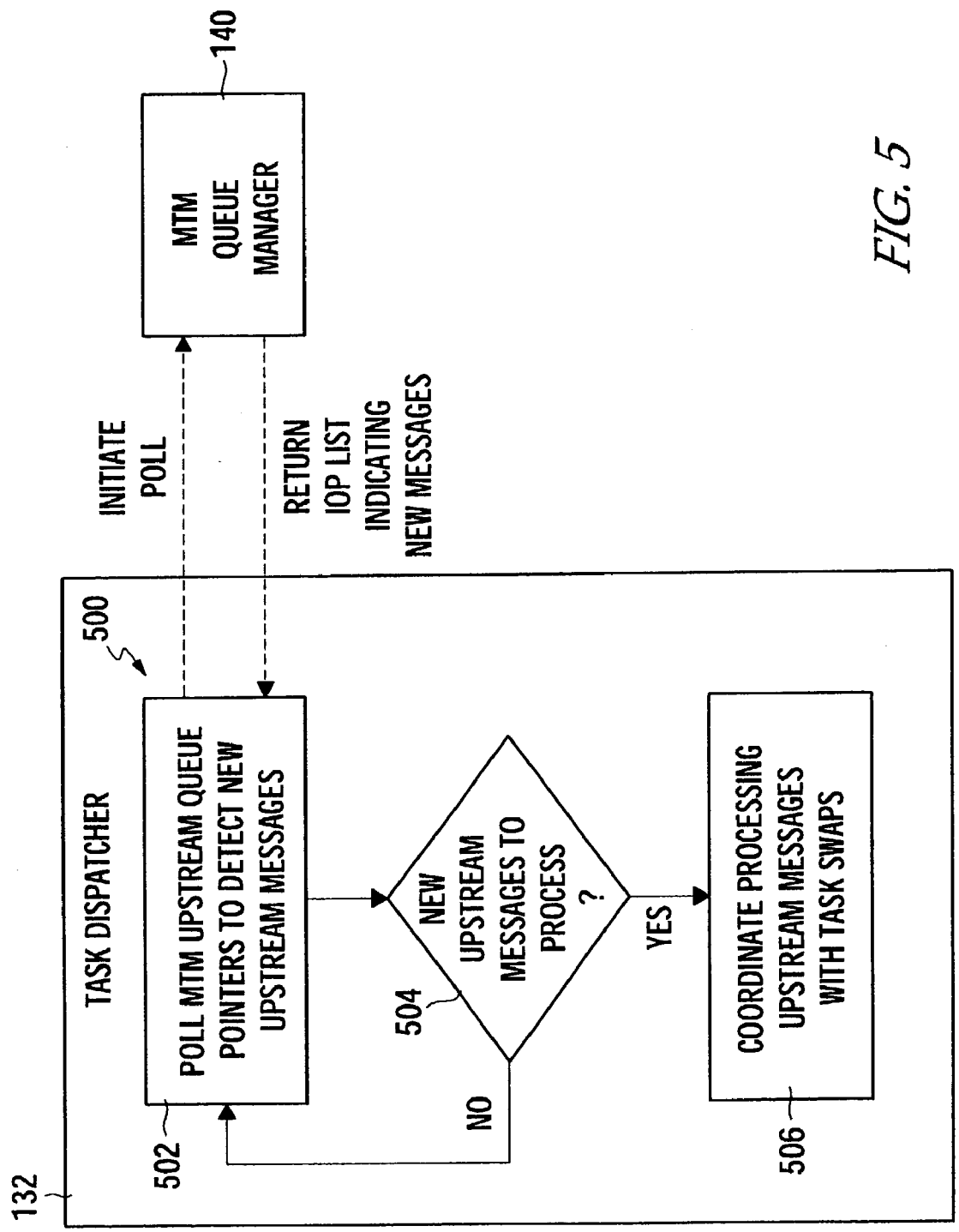
FIG. 5 is a flow chart illustrating exemplary operations for detecting and processing I/O messages in accordance with an embodiment of the present invention.

As illustrated in FIG. 5, for other embodiments, the task dispatcher 132 may simply receive, from the MTM queue manager 140, a list of IOPs having upstream messages to process. For example, the task dispatcher 132 may be configured to perform exemplary operations 500 to initiate a poll (e.g., via the MTM queue manager 140) of upstream queue pointers to detect new upstream messages, at step 502. The MTM queue manager 140 may return a list that indicates which (if any) IOPs 111 have posted new messages to process. Exemplary operations 600 that may be performed by the MTM queue manager 140 to detect new upstream messages are illustrated in FIG. 6.

If new upstream messages are detected, as determined at step 504, processing proceeds to step 506, to coordinate processing the detected upstream messages with task swaps. For example, the task dispatcher may schedule the processing of the detected upstream messages to coincide with naturally occurring task swaps, in an effort to minimize a total number of context switches.

If no new upstream messages are detected, as determined at step 504, the task manager 132 returns to step 502, to again poll for new messages. In general, the task manager 132 may be configured to poll for new upstream messages frequently enough to detect newly posted upstream messages prior to the generation of an interrupt by the IOP 310. Therefore, the polling frequency may be varied depending on the expected I/O activity on the IOPs 111.

Figure 6:
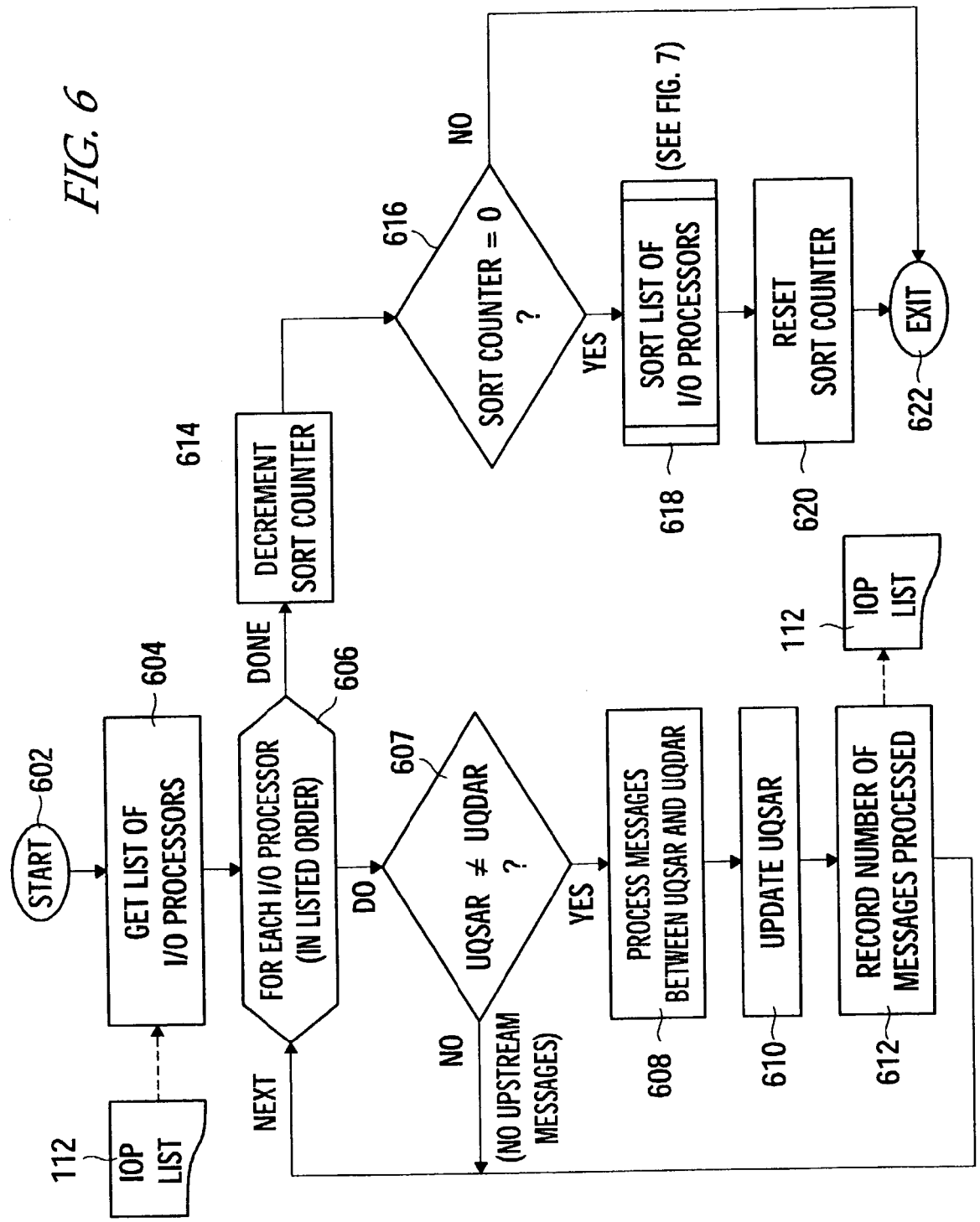
FIG. 6 is a flow chart illustrating exemplary operations for polling I/O processors in accordance with an embodiment of the present invention.

FIG. 6 illustrates exemplary operations 600 that may be performed by the MTM queue manager 140 to poll for newly posted upstream queue messages. The operations begin at step 602, for example, upon being called by the task dispatcher 132. At step 604, the MTM queue manager 140 gets the IOP list 112. At step 606, the MTM queue manager 140 enters a loop of operations (606–612) to be performed for each IOP in the list 112.

At step 606, the MTM queue manager 140 determines if a selected IOP 111 has posted any upstream messages to its upstream queue 160 by comparing the corresponding UQDAR 282 and UQSAR 272. Equal values for UQDAR 282 and UQSAR 272 indicate all the upstream messages for the selected IOP have been processed and processing proceeds to step 606 to select the next IOP.

On the other hand, different values for UQDAR 282 and UQSAR 272 indicate the IOP 111 has posted one or more messages (at upstream queue locations between UQDAR 282 and UQSAR 272) that have not been processed by the processor complex 110. Therefore, at step 608, the MTM queue manager 140 processes any messages between UQSAR and UQDAR and, at step 610, updates the UQSAR 272 (which may be subsequently shadowed in the MTM registers 280 of the IOP 111). As previously described, for some embodiments, rather than process the detected upstream queue messages, the MTM queue manager 140 may simply return an indication that the upstream queue messages exist. Therefore, in such embodiments, the operations of steps 608 and 610 may not be performed.

In either case, at step 612, the number of messages processed (or simply detected) may be recorded. For example, the number of messages processed or detected may be stored in the IOP list 112 with the associated IOP. As previously described, if the MTM queue manager 140 is not configured to process newly detected messages, the task dispatcher 132 may use the number of messages detected for each IOP 110 in subsequent scheduling of IOP message processing.

For some embodiments, the MTM queue manager 140 may poll MTM queue pointers 270 for each IOP in the order the IOPs 111 are listed in the IOP list 112. In such embodiments, the number of messages processed or detected for each IOP during one poll may also be used to sort the list of IOPs in an effort to optimize the order in which the IOPs are polled during subsequent polls (e.g., IOPs with more messages to process may be polled first to ensure no messages are lost). The IOP list 112 sorting may be performed, for example, after a predetermined number of polls. Therefore, after each IOP 111 has been polled for messages, processing continues to step 614, where a sort counter used to track a number polls is decremented. If the sort counter reaches zero, as determined at step 616, the IOP list 112 is sorted, at step 618 and the sort counter is reset, at step 620, prior to exiting the operations 600, at step 622.

Figure 7A:
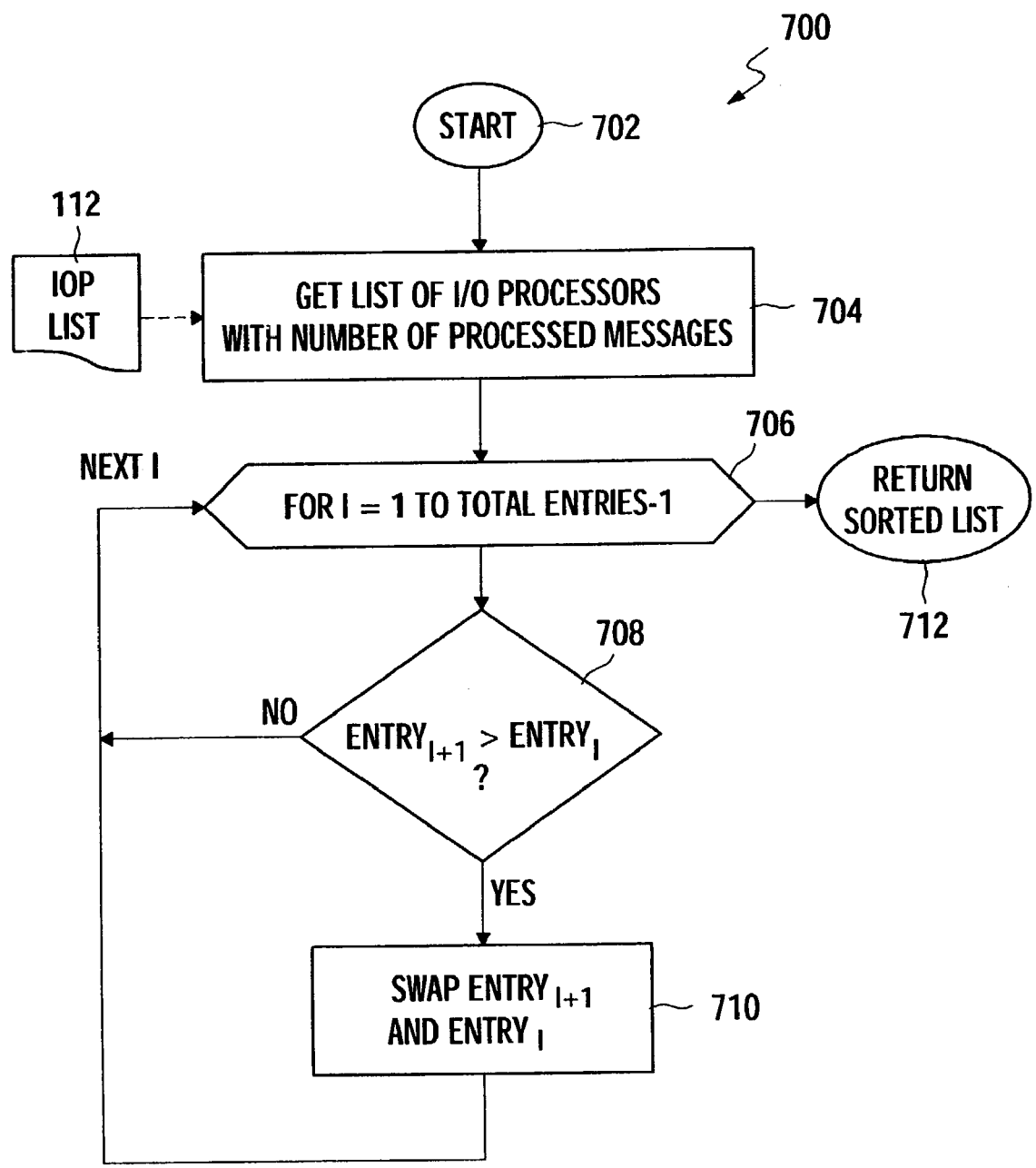
FIG. 7A is a flow chart illustrating exemplary operations for sorting a list of I/O processors in accordance with an embodiment of the present invention.

Any type of suitable sorting algorithm may be performed to sort the IOP list 112. For example, FIG. 7A illustrates exemplary operations 700 of a simple "one-pass" sorting algorithm that may be performed to sort the IOP list 112. The operations 700 may be described with reference to FIG. 7B which illustrates an exemplary IOP list 112 of four IOPs ($IOP_1$, $IOP_2$, $IOP_3$, and $IOP_4$) with their respective number of detected upstream queue messages in parentheses.

The operations 700 begin at step 702, for example, after a predetermined number of polls. At step 704, the IOP list 112 is retrieved (alternatively, the IOP list 112 may have already been retrieved, at step 604 of FIG. 6). At step 706, a loop of operations are entered to be iteratively performed on a pair of successive entries in the IOP list 112 ($IOP_I$ and $IOP_{I-1}$), for example, while traversing down the IOP list 112 from the first listed IOP ($IOP_1$) to the last listed IOP ($IOP_4$). At step 708, a determination is made as to whether a current entry is greater than a prior entry (e.g., $ENTRY_{I+1}$ > $ENTRY_I$). If so, the entries are swapped, at step 710, and processing returns to step 706 to examine the next successive pair of entries.

Figure 7B:
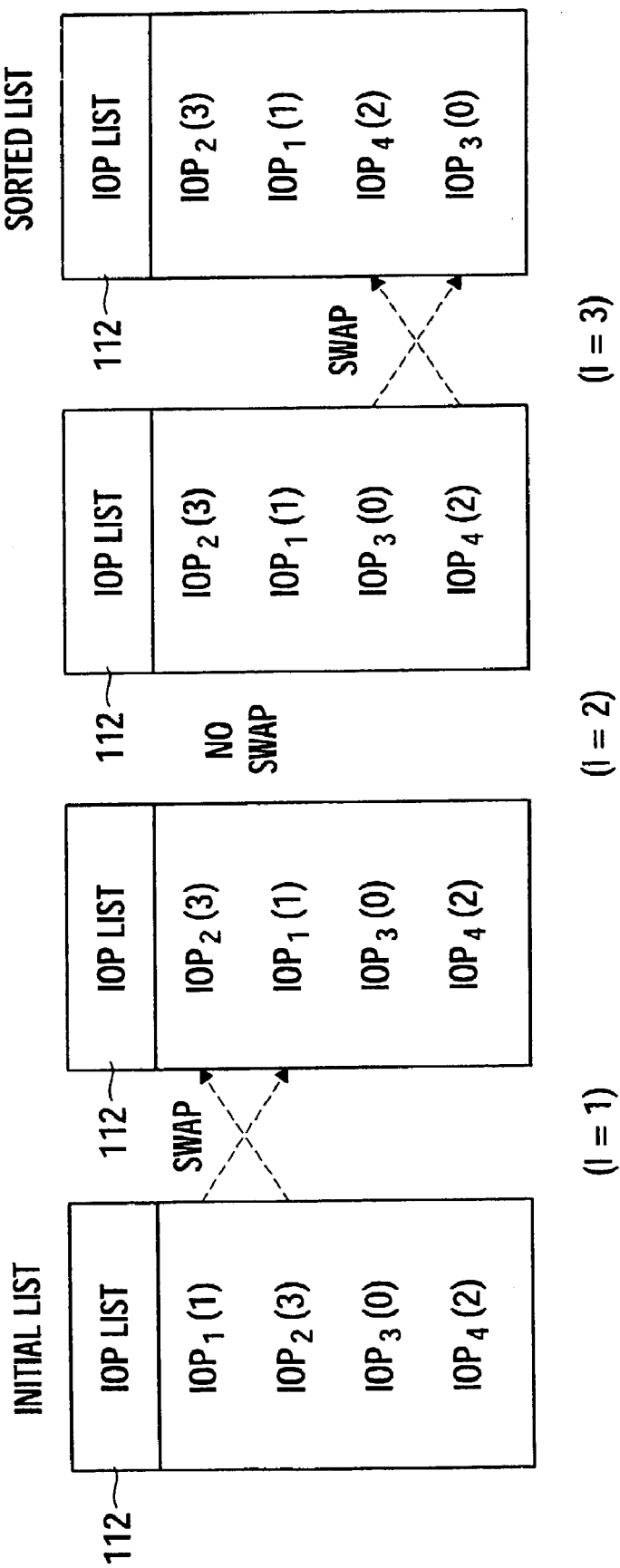
FIG. 7B illustrates an exemplary I/O processor list that may be sorted by the exemplary operations of FIG. 7A.

Referring to FIG. 7B, for the first iteration (I=1), the number of messages processed for $IOP_2$ and $IOP_1$ are examined. As three messages were processed for $IOP_2$ and only one message was processed for $IOP_1$, $IOP_2$ and $IOP_1$ are swapped in the list 112. On the next iteration (I=2), the number of messages processed for $IOP_3$ and $IOP_1$ (having swapped positions with $IOP_2$) are examined. As no messages were processed for $IOP_3$ and one message was processed for $IOP_1$, $IOP_3$ and $IOP_1$ are not swapped. On the next and final iteration (I=3), the number of messages processed for $IOP_4$ and $IOP_3$ are examined. As two messages were processed for $IOP_4$ and no messages were processed for $IOP_3$, $IOP_4$ and $IOP_3$ are swapped, yielding the final sorted list IOP 112 of (in order) IOP2, IOP1, IOP4, and IOP3. The operations 700 are exited, at step 712, by returning the sorted IOP list 112.

Because the operations 700 are performed in a single pass, they may result in very fast and efficient sorting, and may be suitable for many applications. However, for other embodiments, different sorting algorithms may be utilized. For example, a sorting algorithm with an additional sorting pass through the list 112 would result in $IOP_4$ (2 messages) being swapped with $IOP_1$ (1 message).

CONCLUSION

By polling message transport mechanism queue pointers to detect I/O processing events, embodiments of the present invention may minimize the disruptive effects caused by I/O processing related interrupt handling. Further, for some embodiments, the processing related to detected I/O processing events may be scheduled to coincide with naturally occurring task swaps, thus minimizing the number of required context switches.

While the foregoing is directed to embodiments of the present invention, other and further embodiments of the invention may be devised without departing from the basic scope thereof, and the scope thereof is determined by the claims that follow.

What is claimed is:

1. A method for communicating between a processor complex having one or more processors and a plurality of input/output (I/O) processors using at least one message queue associated with each I/O processor, the method comprising, for each I/O processor:

polling a set of pointers to the associated at least one message queue, wherein the set of pointers comprises a first pointer indicating a location of a most recent message posted to the at least one message queue by the I/O processor and a second pointer indicating a location of a most recent message processed by the processor complex;

determining the I/O processor has posted at least one message to the at least one message queue since the most recent message was processed by the processor complex, if values of the first and second pointers are not equal; and if the values of the first and second pointers are not equal, processing, at the processor complex, the at least one message posted by the I/O processor in conjunction with a task swap in which execution is switched from one processor to another processor of the processor complex.

2. The method of claim 1, further comprising, if values of the first and second pointers are not equal:

updating the second pointer after processing the at least one message posted to the at least one message queue by the I/O processor since the most recent message was processed by the processor complex.

3. The method of claim 2, wherein processing, at the processor complex, the at least one message costed by the I/O processor in conjunction with a task swap in which execution is switched from one processor to another processor of the processor complex comprises scheduling processing of the at least one message to occur with a naturally occurring task swap.

4. The method of claim 1, wherein the polling comprises:

accessing a list of I/O processors; and for each I/O processor in the list, examining the associated set of pointers to determine the number of messages posted to the associated at least one message queue by the I/O processor since the most recent message was processed by the processor complex, and recording the number.

5. The method of claim 4, further comprising sorting the list of I/O processors based on the recorded numbers.

6. A computer readable storage medium containing a program for detecting messages posted by one or more I/O processors to associated upstream message queues which, when executed, performs operations, comprising, for each I/O processor:

polling a set of pointers to the associated upstream message queue, wherein each set of pointers comprises a first pointer indicating a location of a message posted to the associated upstream message queue by the I/O processor and a second pointer indicating a location of a most recent message processed by a processor complex;

determining the I/O processor has posted at least one message to the associated upstream message queue since the most recent message was processed by the processor complex, if values of the first and second pointers are not equal; and if the values of the first and second pointers are not equal, processing, at the processor complex, the at least one message posted by the I/O processor in conjunction with a task swap in which execution is switched from one processor to another processor of the processor complex.

7. The computer readable medium of claim 6, wherein the operations further comprise, if values of the first and second pointers are not equal:

processing the at least one message posted to the at least one message queue by the I/O processor since the most recent message was processed by the processor complex and updating the second pointer.

8. The computer readable medium of claim 6, wherein processing the at least one message posted to the at least one message queue by the I/O processor since the most recent message was processed by the processor complex comprises coordinating the processing with a task swap.

9. An input/output (I/O) processing system, comprising:
a processor complex having one or more processors;
a plurality of I/O processors, each coupled with one or more I/O devices;
at least one upstream queue corresponding to each I/O processor;
a set of queue pointers comprising, for each upstream queue, a first pointer indicative of a location of a most recent message posted to the upstream queue by a corresponding I/O processor and a second pointer indicative of a location of a most recent message processed by the processor complex; and an executable software component configured to poll the set of pointers to determine, for each upstream queue, the number of messages that have been posted to the upstream queue by the corresponding I/O processor since the most recent message was processed by the processor complex, based on relative values of the corresponding first and second pointers, and if the values of the first and second pointers are not equal, processing, at the processor complex, the messages posted by the I/O processor in conjunction with a task swaps in which execution is switched from one processor to another processor of the processor complex.

10. The system of claim 9, wherein the executable software component is further configured to, for each upstream queue, process messages that have been posted to the upstream queue by the corresponding I/O processor since the most recent message was processed by the processor complex.

11. The system of claim 10, wherein the executable software component is configured to coordinate the processing of messages in conjunction with task swaps by scheduling processing of the messages with naturally occurring task swaps.

12. The system of claim 9, wherein an order in which the sets of pointers are polled is determined by an order of the I/O processors in the list.

13. The system of claim 12, wherein the executable software component is configured to maintain a list of the I/O processors, along with a number of messages processed for a given poll.

14. The system of claim 13, wherein the executable software component is further configured to sort the I/O processors in the list based on the corresponding number of messages processed for each I/O processor for a given poll.

* * * * *